United States Patent [19]

Garlitz

[11] Patent Number: 5,317,808
[45] Date of Patent: Jun. 7, 1994

[54] HOLE CUTTING APPARATUS
[76] Inventor: Cecil W. Garlitz, Route 3, Box 64A, Meyersdale, Pa.
[21] Appl. No.: 984,346
[22] Filed: Dec. 2, 1992
[51] Int. Cl.$^5$ .............................................. B26B 3/08
[52] U.S. Cl. ...................................... 30/310; 83/451; 83/582; 83/596; 33/27.01
[58] Field of Search ............. 30/286, 310, 300, 27.01, 30/27.03, 27.031; 83/596, 563, 451, 582

[56] References Cited
U.S. PATENT DOCUMENTS

| | | | |
|---|---|---|---|
| 1,326,318 | 12/1919 | Baca | 33/27.03 |
| 2,269,510 | 1/1942 | Bates | 30/310 |
| 2,735,486 | 2/1956 | Millard | 30/310 |
| 4,060,893 | 12/1977 | Matsuura | 30/310 |
| 4,878,409 | 11/1989 | Carithers, Jr. | 33/27.01 |

Primary Examiner—Richard K. Seidel
Assistant Examiner—Hwei-Siu Payer
Attorney, Agent, or Firm—Joseph J. Zito

[57] ABSTRACT

A circle cutting devices includes a pair of opposing discs rotatably coupled together about a common axis by a spindle extending axially from one of the discs. A spring biasing assembly is coupled to the spindle to bias the discs together by a constant pressure. A cutting tool and a pair of rollers are positioned on an inner face of one of the discs to engage and cut the material by rotating the disc.

19 Claims, 3 Drawing Sheets

HOLE CUTTING APPARATUS

FIELD OF THE INVENTION

The present invention is directed to a hole cutting apparatus. More particularly, the invention relates to an apparatus for cutting circular holes in sheet metal and other malleable materials.

BACKGROUND OF THE INVENTION

Devices for manually cutting circles from pieces of metal, plastic and glass have long been known and are commercially available. These devices typically consist of a central supporting structure and radially extending arm, pivotally attached to the central support. A cutting head is mounted on the arm for movement in a circular path about the supporting structure. The mounting arm is normally provided with a distance scale to facilitate setting of the head for cutting a circle of the desired diameter.

One example of a cutting device is disclosed in U.S. Pat. No. 5,014,436. The disclosed apparatus is for manually cutting circles from glass utilizing a center support structure, in combination with a rule having a distance scale thereon, and a cutting head adjustably mounted on the rule. Reversal of the position of the cutting head on the supporting rule adapts it for use with either of two different forms of cutting components. The central pivot support includes a suction cup type device to secure the apparatus in place during use.

Another example of the prior art circle cutting devices is disclosed in U.S. Pat. No. 4,878,409. The apparatus is for cutting circular arcs or holes in a picture mat and includes a flat base upon which the mat rests and a platform provided above the base. A crank mechanism and an extending perpendicular arm are provided for a cutting blade is adjustably mounted along the arm at an angle to the mat. The circles or arcs are cut in the mat by rotation of the crank mechanism with a diameter determined by the position of the cutting blade.

U.S. Pat. No. 2,735,486 discloses a device for cutting an abrasive disc or gasket. The device includes a table and spindle extending upwardly from the table through the material to be cut. A knife is mounted on an arm extending from the spindle and parallel to the table. The arm is pivoted around the spindle to cut the material.

U.S. Pat. No. 4,773,798 discloses a portable washer cutting device. The device as disclosed comprises a pair of enclosures to be interconnected and operative to rotate to progressively close the gap between the enclosures. A cutting knife is secured in one enclosure to progressively engage a flat washer blank with each rotation of the enclosure. The enclosures are rotated about a common spindle with respect to each other.

Numerous other circle cutting devices are disclosed in U.S. Pat. Nos. 4,060,893, 2,269,510 and 5,007,320. All of the above-noted devices are limited by their capacity, dimensions and ability to cut specified material. Some of these devices are limited to cutting holes in sheet goods of a predetermined size.

A demand continues in the art for a device that is able to cut circles from sheet materials and in particular sheet metal, plastics and other malleable materials to precise specifications. There is further a need for a device that is convenient and simple to use and relatively inexpensive to manufacture.

SUMMARY OF THE INVENTION

The disadvantages and limitations of the prior circle cutting devices are obviated by the present invention while providing an efficient and effective cutting device. It is a primary object of this invention to manufacture a circle cutting apparatus that is able to cut a variety of sizes of holes or circles in a variety of materials.

The circle cutting device of the invention is particularly suitable for cutting any malleable material such as metal and plastics. The cutting device basically comprises a base and cutting disc rotatably coupled to the base about a common central axis. A pivot spindle extends from the center of the base and through the center of the cutting disc. The face of the cutting disc opposing the base includes at least one cutting blade and at least one roller to contact the material being cut.

The cutting disc includes a spring biasing device to bias the cutting blade toward the base. The spring biasing device includes a threaded tension nut threaded onto the spindle extending from the base. A spring is disposed between the tension nut and the cutting disc. A locking bolt extends through an upper end of the tension nut to engage the axial end of the spindle to lock the position of the tension nut with respect to the spindle.

A sheet of material to be cut is formed with an aperture and the spindle on the base is inserted through the aperture. The cutting disc is then placed on the spindle and the tension nut is tightened to engage the cutting blade against the material to be cut. The cutting disc is then rotated with respect to the base and the sheet material until the cutting blade cuts through the sheet material.

These and other features of the invention will become apparent from the following detailed description, which when taken in conjunction with the drawings disclose preferred embodiments of the invention.

BRIEF DESCRIPTION OF THE DRAWINGS

Referring to the drawings which form a part of the disclosure in which.

DETAILED DESCRIPTION OF THE INVENTION

Figure 1:
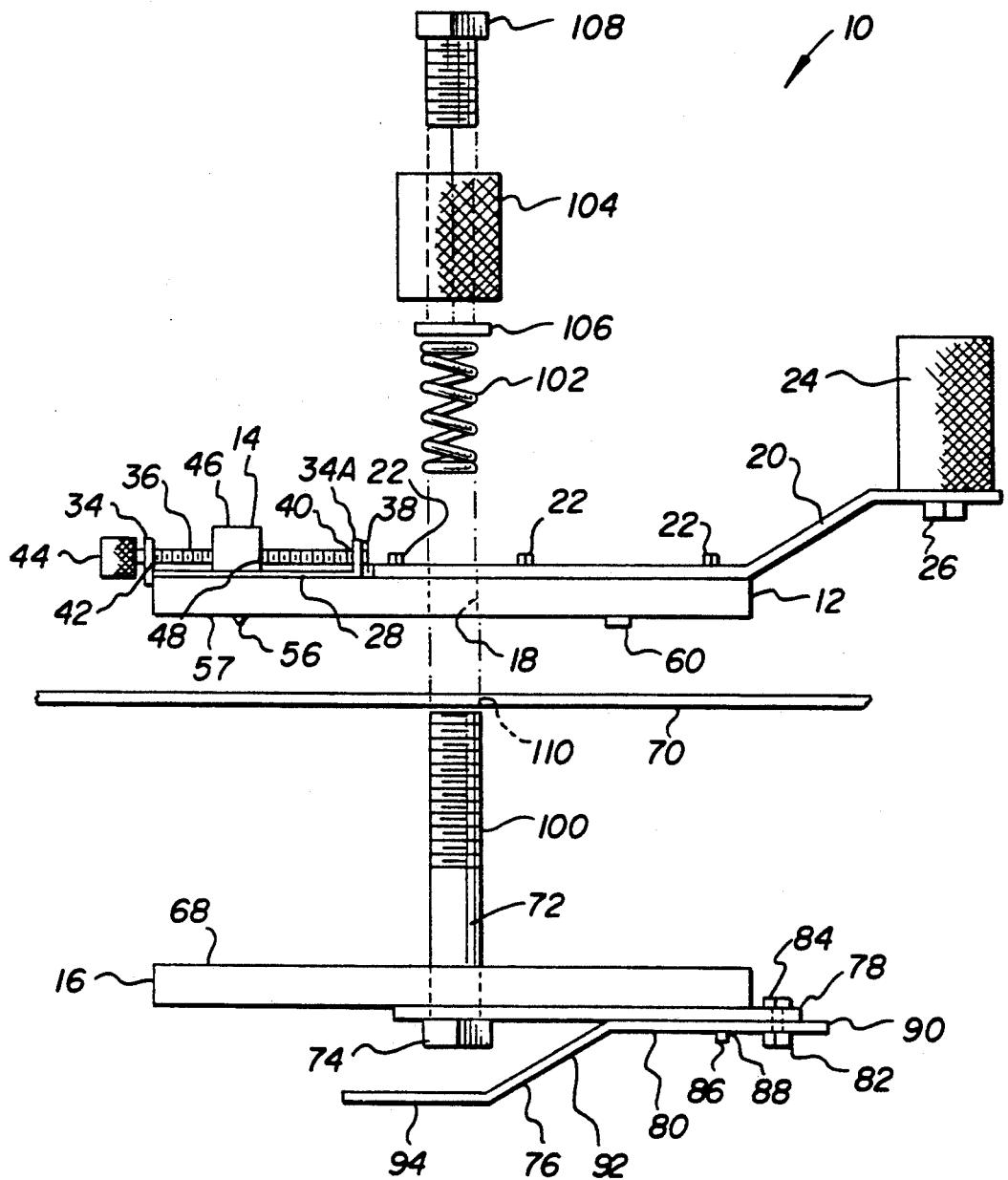
FIG. 1 is an exploded side view of the circle cutting device of the invention.

The present invention relates to a device for cutting circles and circular holes in sheet materials. The cutting device 10 as shown in FIGS. 1-4 is particularly suitable for cutting sheet metal, plastics and other malleable materials. The arrangement of components effectively cuts hard sheet steel to form a precision cut hole with no sharp or jagged edges. The cutting device 10 basically comprises a cutting disc 12 having a cutting assembly 14 where the cutting disc 12 is rotatably coupled to a base disc 16.

The cutting disc 12 is a solid or hollow plate-like member having a central aperture 18. A handle assembly is attached to an outer face of the disc 12 which includes an arm 20 attached to the disc 12 by a plurality of threaded bolts 22. A handle 24 is pivotally connected to the outer end of arm 20 by a bolt 26 extending through an aperture in the arm 20 and into the handle 24.

Figure 2:
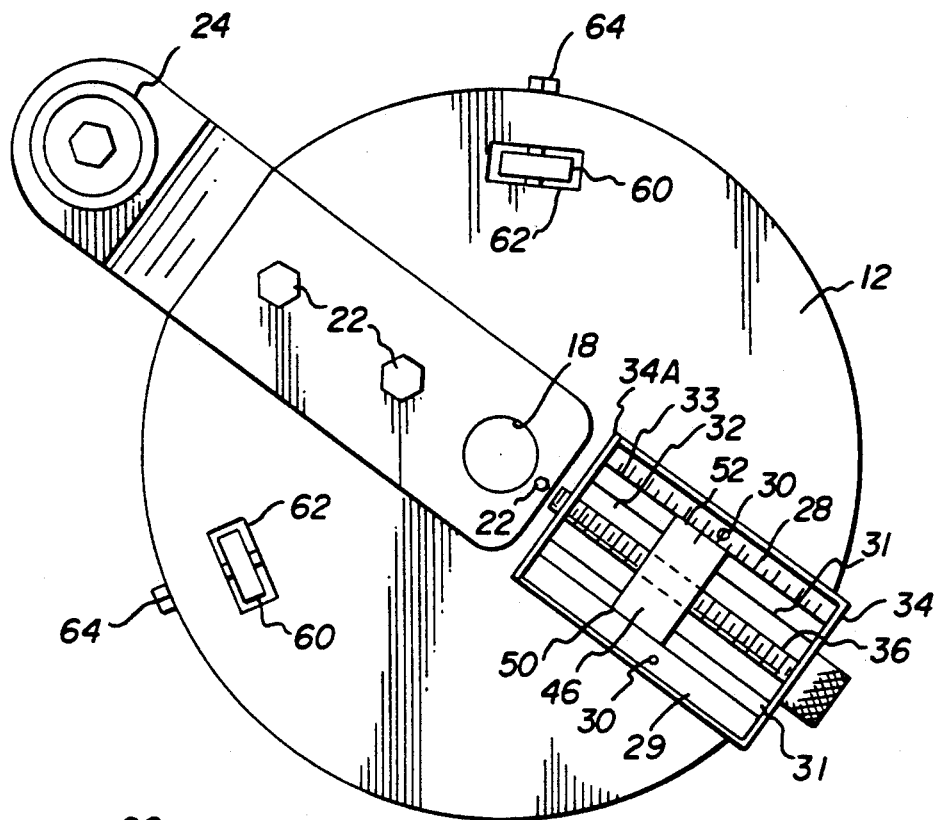
FIG. 2 is a top plan view of the cutting disc in accordance with a preferred embodiment of the invention.
Figure 4:
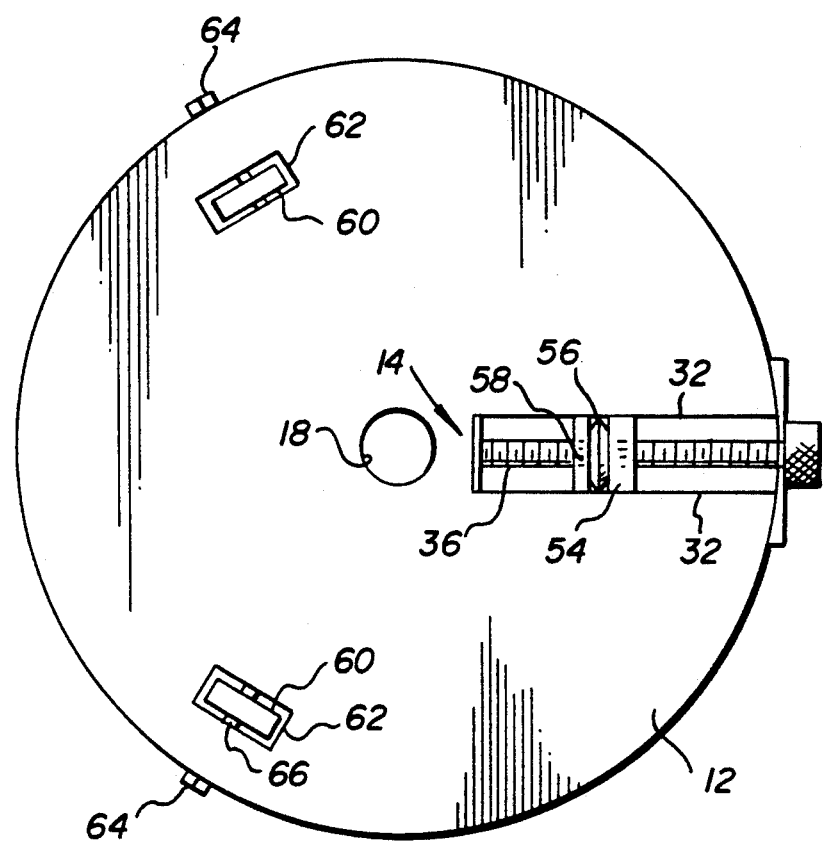
FIG. 4 is a bottom plan view of the cutting disc inaccordance with a preferred embodiment.

As shown in FIGS. 2 from above and FIG. 4 from below the cutting assembly 14 is coupled to the disc 12 on the outer face. The cutting assembly 14 includes a frame having spaced-apart elongated planar side bars 28 and 29 disposed radially with respect to the axis of the disc 12. The frame is attached to the disc 12 by a pair of screws 30 as shown in FIG. 2. A pair of upstanding end pieces 34 and 34A are attached to the ends of the elongated planar portions 28, and 29. The end pieces 34 and 34A extend substantially perpendicular to the disc 12.

The cutting assembly 14 is positioned on the disc 12 over a radial slot 32 in disc 12 such that the elongated planar portions 28 and 29 straddle each radial edge of the slot 32 as shown in FIG. 2. An elongated threaded screw member 36 extends between the end pieces 34 and 34A of the frame and is journaled in apertures 40 and 42 in the end pieces 32 and 34 respectively. A retaining clip 38 is attached to one end of threaded member 36 adjacent the end piece 34A. A turning knob 44 is attached to the opposite end of the screw member 36 adjacent the end piece 34 such that the knob 44 can be easily grasped by the operator.

A block 46 has a transverse threaded bore 48 receiving the threaded member 36 such that rotation of the threaded member 36 moves the block radially inwardly and outwardly with respect to the disc 12. The block 46 includes a bottom bearing portion (not shown) which slides against the disc face 31 between the frame members 28 and 29. The side faces 50 and 52 of the block 46 slide along the frame members 28 and 29. The block 46 also includes a leg portion 54 as shown in FIG. 4 which extends downwardly through the slot 32 of the disc 12.

A cutting device 56 is attached to the leg portion 54 of block 46 and projects through the slot 32 a slight distance beyond the inner face 57 of disc 12. The cutting device 56 is preferably a high strength steel cutting wheel rotatably mounted in the block 46 by an axle pin 58 extending through a bore in the block 46. As shown in FIG. 4, the cutting device 56 is arranged such that the device cuts in a tangential direction with respect to the disc 12. In alternative embodiments, the cutting device 56 is a fixed blade of steel or ceramic material.

The disc 12 also includes at least one and preferably two pressure distribution rollers 60 extending from the lower face of the disc at a radial distance near the center of the radial adjustment of the cutting device 56. The rollers 60 are disposed in slots 62 to roll tangentially with respect to the disc 12. An elongated thread bolt 64 extends through a threaded radial bore 66 and through an axial bore in the rollers 60 to rotatably mount the rollers 60 on the disc 12.

Figure 3:
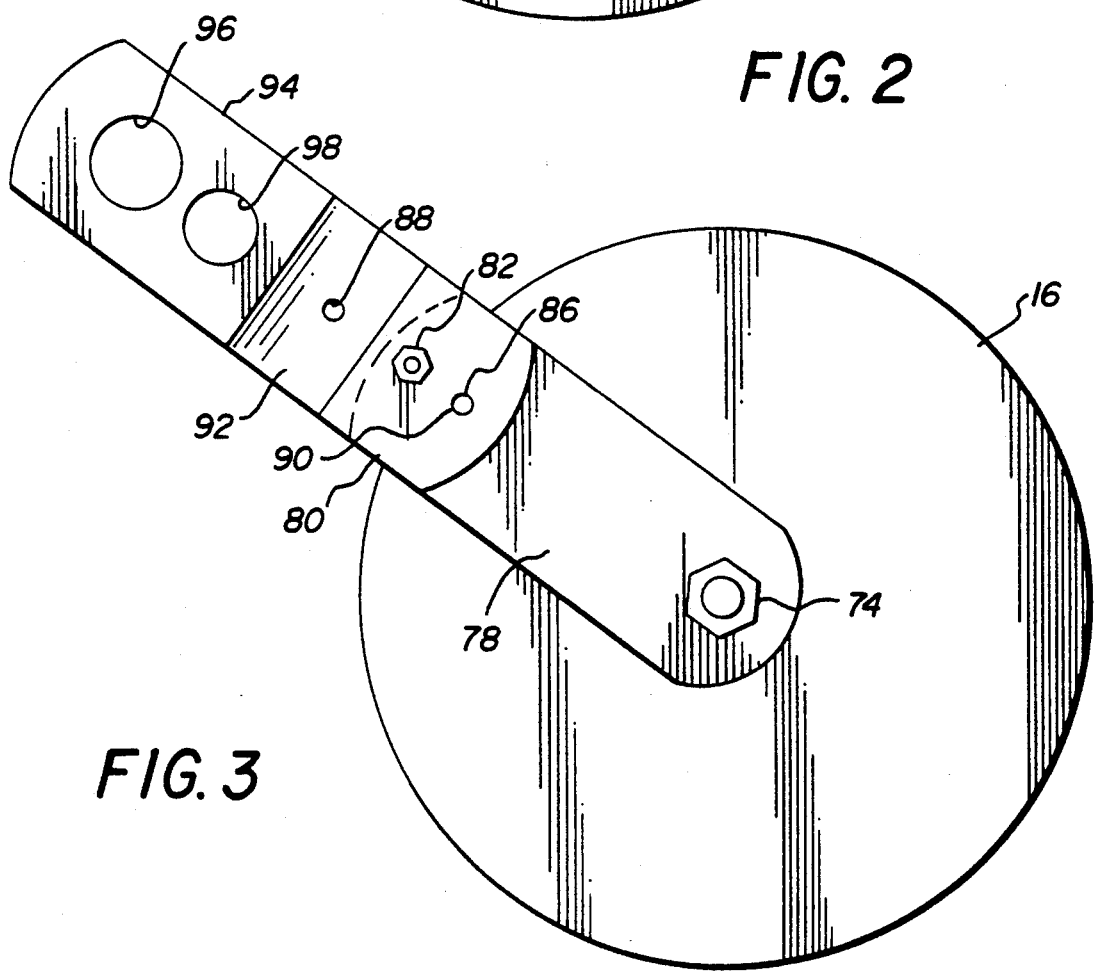
FIG. 3 is a bottom plan view of the pressure disc in accordance with a preferred embodiment.

The supporting disc 16, as illustrated in FIGS. 1 and 3, has a substantially flat inner surface 68 for supporting the sheet material 70 to be cut. A central aperture extends axially through the disc which receives a threaded spindle 72. The spindle 72 extends from the inner face 68 of the disc 12 and is attached thereto by a nut 74 to prevent the spindle from rotating on the disc. A handle 76 is also coupled to the disc 16 by the spindle 72 and bolt 74 passing through an aperture in the handle.

As shown in FIG. 1, the handle 76 includes a first section 78 bolted to the disc 16 and extending radially outward with respect to the disc 16. A second, outer arm section 80 is attached to the outer end of arm 78 by a nut 82 and bolt 84 such that the outer arm 80 can pivot 180° from the position shown in FIG. 1 to the position shown in FIG. 3. A pin 86 extends from the arm 78 which is received alternately in one of two apertures 88 and 90 in the outer arm 80 to lock the arm 80 in place. The outer handle 80 includes an angled middle portion 92 and an end portion 94 which is essentially parallel to the portion 80. As shown in FIG. 3 a pair of holes 96 and 98 may be provided in the end portion 94 to reduce the weight of the device.

A tension adjusting assembly is removably coupled to the spindle to apply a biasing force of the disc 12 and cutting device 56 toward the disc 16. The tension assembly includes a threaded portion 100 on the axial end of the spindle 72 extending from the disc 16, a coil spring 102 around the spindle 100 and a tension adjusting nut 104. The tension nut 104 as shown is a round nut having a knurled outer surface and an internally threaded bore. A washer 106 is positioned between the spring 102 and the tension nut 104. A threaded locking bolt 108 is received in the bore in the tension nut 104 to lock the tension nut in position on the spindle 72.

The cutting assembly is particularly suitable for cutting a circular hole in a sheet materials. A pilot hole 110 is initially formed in the sheet material 70 and the spindle 72 is passed through the hole 110. The disc 16 and spindle are maneuvered and held in the desired position by the operator grasping the handle 76 attached to the disc 16. The disc 12 is then placed on the spindle 72 with the spindle 72 passing through the aperture 18 in the disc 12. Knob 44 is rotatated to selectively adjust the position of the cutting device 56 to the desire size of circle to be cut. One or both of side bars 28 and 29 can be provided with index marks 33 to allow slections of a desired diameter circle by alignment of index mark 37 on the block 46.

Next the spring 102, washer 106 and tension nut are placed on the threaded end of the spindle. The tension nut 104 is screwed onto the threaded end 100 of spindle 72 until the spring 102 biases the disc 12 toward the disc 16 and the cutting device 56 against the material 70 to be cut. Handle 24 is then rotated while holding the handle 94 to prevent rotation of the disc 16. The rotary movement of the disc 12 and the cutting device 56 cuts a smooth circle in the material 70. The cutting force of the cutting device 56 against the material 70 can be adjusted by rotating the tension nut 104 on the spindle 72. The uniform spring tension of the cutting device 56 on the material contributes to the smooth cut.

Further advantages of the assembly are realized by the rollers 60 on the disc 12. As shown in FIG. 4, the rollers 60 are spaced about 120° from the cutting device 56. The rollers 60 allow the disc 12 to remain substantially parallel to the disc 16 during the cutting operation, which further allows the cutting device 56 to remain perpendicular to the material being cut. This feature prevents the cutting device from tending to wander and produce jagged edges. Furthermore, it allows the spring to apply a constant and uniform pressure of the cutting device on the material being cut.

In preferred embodiments, the spring 102 is a coil spring although other biasing means may be used. The spring must have sufficient strength to tension the disc 12 and cutting device 56 toward the material 70 to cut the material 70. The spring may be tensioned a small amount at the beginning of the cutting operation and increased incrementally throughout the cutting operation. Preferably the spring is tensioned an amount sufficient to cut the material by simply rotating the disc 12 without further adjustment.

Once the spring 102 is properly tensioned, the lock bolt 108 is threaded into the tension nut 104 until the bolt 108 engages the axial end of the spindle 72. Tightening the bolt 108 against the spindle 72 secured the tension nut 104 in place during the cutting operation.

While advantageous embodiments have been chosen to illustrate the invention, it will be understood by those skilled in the art that various changes and modifications can be made therein without departing from the scope of the invention as defined in the appended claims.

I claim:

1. A cutting device for cutting a circular cut-out from a sheet material comprising:
   a cutting disc rotatably coupled to a central axis having cutting means for cutting a circular cut-out from a sheet material, said cutting means extending outwardly from an inner planar face of said cutting disc;
   a support disc rotatably coupled to said cutting disc about said central axis, said support disc including an inner planar face configured for substantial planer alignment with said inner planar face of said cutting disc, wherein said sheet material is supported between said inner planar faces of said cutting and support discs when said faces are in said substantial planar alignment;
   spring biasing means operatively engaging said cutting disc for biasing said cutting disc along said axis toward said support disc, applying cutting pressure by said cutting means to said sheet material; and
   handle means attached to said cutting disc for rotating said cutting disc about said central axis causing said cutting means to follow a circular path along said sheet material.

2. The cutting device of claim 1, further comprising a spindle extending from a central axis of said support disc, said cutting disc having a central aperture for receiving said spindle for rotatably coupling said cutting disc to said support disc.

3. The cutting device of claim 2, wherein said spring biasing means comprises tension nut removably coupled to said spindle and a spring disposed between said tension nut and said support disc.

4. The cutting device of claim 3, wherein said spindle has a threaded axial end and said tension nut includes internal threads for coupling the tension nut with said spindle.

5. The cutting device of claim 4, further comprising, a threaded locking bolt coupled to said tension nut to fix the position of said tension nut with respect to said spindle.

6. The cutting device of claim 1, said cutting disc further comprising at least one roller means on said inner face of said cutting disc having an axis of rotation radially disposed with respect to said cutting disc and being spaced from said cutting means to enable said cutting means to apply a uniform cutting pressure to said sheet material while rotating said cutting disc with respect to said support disc.

7. The cutting device of claim 6 comprising two roller means on said cutting disc and each spaced about 120° from said cutting means.

8. The cutting device of claim 1, further comprising means for radially adjusting the position of said cutting means on said cutting disc.

9. The cutting device of claim 8, said radial adjusting means comprising a radially disposed elongated threaded member rotatably coupled to said cutting disc and a block having internal threads receiving said threaded member, said cutting means being coupled to said block.

10. The cutting device of claim 9, wherein said elongated threaded member includes a knob for rotating said member.

11. The cutting device of claim 1, said support disc further comprising support disc handle means for holding said support disc to allow said cutting disc to rotate relative to said support disc.

12. The cutting device of claim 11, wherein said support disc handle means is extendable.

13. A cutting device for cutting a circular cut-out from sheet material comprising:
   a cutting disc having a central aperture, an outer face and an inner face;
   cutting means coupled to said cutting disc and radially adjustable with respect to said cutting disc said cutting means extending axially from said inner face for cutting a circular cut-out;
   a support disc having a central spindle extending axially from said support disc and extending through said central aperture in said cutting disc to removably and rotatably couple said cutting disc to said support disc, said support disc including means for supporting said sheet material;
   spring biasing means removably coupled to said spindle for selectively biasing said cutting disc against said support disc and said cutting means against the sheet material; and
   handle means attached to said cutting disc for rotating said cutting disc with respect to said support disc.

14. The cutting device of claim 13 wherein said spring biasing means comprises tension nut removably coupled to said spindle and a spring disposed between said tension nut and said cutting disc.

15. The cutting device of claim 14 wherein said spindle has a threaded axial end and said tension nut includes internal threads for coupling the tension nut with said spindle.

16. The cutting device of claim 15 further comprising, a threaded locking bolt coupled to said tension nut to fix the position of said tension nut with respect to said spindle.

17. The cutting device of claim 13, said cutting disc further comprising at least one roller means on said inner face having an axis of rotation radially disposed with respect to said cutting disc and being spaced from said cutting means to enable said cutting means to apply a uniform cutting pressure to said sheet material while rotating said cutting disc with respect to said support disc.

18. The cutting device of claim 17 comprising two roller means on said cutting disc and each spaced about 120° from said cutting means.

19. The cutting device of claim 13, said radial adjustable cutting means comprises a radially disposed elongated threaded member rotatably coupled to said cutting disc and a block having internal threads receiving said threaded member, and said cutting means coupled to said block.

* * * * *